United States Patent [19]
Enari

[11] Patent Number: 5,933,499
[45] Date of Patent: *Aug. 3, 1999

[54] IMAGE PROCESSING APPARATUS

[75] Inventor: Masahiko Enari, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/323,114

[22] Filed: Oct. 14, 1994

[30] Foreign Application Priority Data

Oct. 18, 1993 [JP] Japan ................................. 5-259770

[51] Int. Cl.$^6$ ............................ H04N 7/167; H04L 9/00; H04L 9/06
[52] U.S. Cl. ................................ 380/10; 380/4; 380/5; 380/9; 380/29; 380/37; 380/49; 380/54
[58] Field of Search ............................... 380/3, 4, 5, 6, 380/7, 9, 10, 54, 11, 14, 19, 33, 34, 38, 39, 40, 29, 49, 50, 59, 37

[56] References Cited

U.S. PATENT DOCUMENTS

| | | | |
|---|---|---|---|
| 4,602,283 | 7/1986 | Corgnier et al. | 380/14 |
| 4,620,224 | 10/1986 | Lee et al. | 380/14 |
| 4,633,310 | 12/1986 | Gautier | 380/14 |
| 4,636,851 | 1/1987 | Drury et al. | 380/11 |
| 4,673,975 | 6/1987 | Inaba et al. | 380/14 |
| 4,731,837 | 3/1988 | Gautier | 380/14 |
| 4,747,138 | 5/1988 | Marie et al. | 380/14 |
| 4,908,834 | 3/1990 | Wiedemer | 380/5 |
| 5,321,748 | 6/1994 | Zeidler et al. | 380/14 |
| 5,506,903 | 4/1996 | Yamashita | 380/19 |
| 5,682,425 | 10/1997 | Enari | 380/10 |

FOREIGN PATENT DOCUMENTS

| | | |
|---|---|---|
| 0582122 | 2/1944 | European Pat. Off. . |
| 0364285 | 4/1990 | European Pat. Off. . |
| 0485230 | 5/1992 | European Pat. Off. . |
| 0542261 | 5/1993 | European Pat. Off. . |
| 0614308 | 9/1994 | European Pat. Off. . |
| 0619677 | 10/1994 | European Pat. Off. . |
| 9415437 | 7/1994 | WIPO . |

*Primary Examiner*—Bernard E. Gregory
*Attorney, Agent, or Firm*—Fitzpatrick, Cella, Harper & Scinto

[57] ABSTRACT

An image processing apparatus separates input image data into low resolution image data and one or more auxiliary image data for interpolating the low resolution image data, and decrypts at least one of the separated auxiliary image data. The image processing apparatus also separates input image data into low resolution image data and at least one auxiliary image data for interpolating the low resolution image data and decodes the image data with at least one of the auxiliary image data being encrypted, and decrypts the encrypted auxiliary image data and synthesizes the low resolution image data with the auxiliary image data.

70 Claims, 15 Drawing Sheets

IMAGE PROCESSING APPARATUS

BACKGROUND OF THE INVENTION

1. Field of the Invention

The present invention relates to an image processing apparatus, and more particularly to the encryption of image data.

2. Related Background Art

FIG. 1 is a block diagram of a configuration of a prior art image encoding apparatus having an encryption function.

FIG. 2 is a block diagram of an image decoding apparatus for decoding the image data encoded by the apparatus of FIG. 1.

In the encoding apparatus shown in FIG. 1, numeral 110 denotes a high resolution analog video signal (hereinafter referred to as an HD signal), which, in the present example, has 1,050 scan lines and a frame frequency of 30 Hz. Relative to the HD signal, a video signal of an ordinary resolution having 525 scan lines, a frame frequency of 30 Hz and pixels 858 is referred to as an SD signal.

An HD A/D conversion circuit 112 samples the video signal 110 at a sampling frequency of 54.054 MHz to convert it to a digital signal. By virtue of the sampling frequency, the number of pixels per line of the digital HD signal is 1,716. A high resolution (HD)/ordinary resolution (SD) conversion circuit 114 reduces the number of pixels to one half in both the vertical direction and horizontal direction to output a video signal of the ordinary resolution having 525 scan lines, the frame frequency of 30 Hz and 858 pixels per line.

An encoding circuit 116 efficiently encodes the digital SD signal outputted from the conversion circuit 114 by an encoding scheme which is a combination of motion compensated adaptive prediction encoding and DCT. A decoding circuit 118 decodes the encoded signal outputted from the decoding circuit 116 to reproduce an SD signal. An SD/HD conversion signal 120 interpolates pixels to the output video data from the decoding circuit 118 by a factor of two in both the vertical direction and horizontal direction to convert it to an HD signal. Namely, the SD/HD conversion circuit 120 outputs a signal corresponding to the high resolution video signal having 1,050 scan lines, 1,716 pixels per line and the frame frequency of 30 Hz.

A subtractor 122 subtracts the output of the SD/HD conversion circuit 120 from the output of the A/D conversion circuit 112 for each pixel. The output of the subtractor 122 is referred to as an auxiliary video signal. An encoding circuit 124 encodes the output of the subtractor 122 in the same encoding scheme as that for the encoding circuit 116.

A multiplexing circuit 126 multiplexes the encoded data (the encoded SD signal) outputted from the encoding circuit 116 and the encoded data (the encoded auxiliary video signal) outputted from the encoding circuit 124 and outputs it to an encryption circuit 128. The encryption circuit 128 encrypts the output of the multiplexing circuit 126 in accordance with an encryption key signal of an encryption key output circuit 130, and an output unit 132 outputs the encrypted data outputted from the encryption circuit 128 to a transmission line. As described above, the transmission line may be a communication line or a recording medium.

The encryption is briefly described with reference to FIGS. 3 and 4. The following encryption techniques are available.

FIG. 3 is a flow chart of the encryption by the U.S. Data Encryption Standard (DES) published in the FIPS Publication 46 dated Jan. 15, 1977, and FIG. 4 shows a function of the encryption of FIG. 3. The data encryption algorithm of the DES is published as the "Data Encryption Standard" as described above. Referring to FIGS. 3 and 4, the DES is explained.

The DES converts block encryption to binary data comprising 0's and 1's. In the DES, the binary data is grouped into 64-bit blocks and the transposition and the replacement are repeated for each block to encrypt it. An encryption key is a 64-bit signal, of which 8 bits are check bits for detecting an error. Thus, a 56-bit encryption key is actually effective. The replacement of the digit is controlled by the encryption key in each cycle. FIG. 3 shows an encryption process of the DES. FIG. 4 shows a function fK(R) which is the heart of the encryption.

As shown in FIG. 3, a 64-bit plain text is first transpositioned. This is a fixed transposition independent from the encryption key. Then, the 64 bits are divided into a left half $L_0$ and a right half $R_0$. Then, the following operations are repeated over the 16 stages:

$$L_n = R_{n-1}$$
$$R_n = L_{n-1} + fk_n(R_{n-1}) \qquad (1)$$

where + represents a sum of mode 2 for each bit, $L_n$ and $R_n$ represent the left half 32 bits and the right half 32 bit, respectively, at the end of the operation for the n-th stage, and $K_n$ is generated from the encryption key as shown in the right side of FIG. 3. In FIG. 12, $s_1 \ldots s_{16}$ are 1 or 2.

Condensed transposition is defined as the transposition excluding some of the input. In FIG. 3, 8 bits out of the 56 input bits are excluded so that an output comprises 48 bits. The condensed transposition is irrevocable conversion so that the input cannot be perfectly reproduced from the output. This serves to make the estimation of the encryption key difficult.

Referring to FIG. 4, the function fK(R) in FIG. 3 is specifically described. In FIG. 4, to generate the function fK(R), augmented transposition is made to R. The augmented transposition is defined as the overlapped transposition of some inputs. In the illustrated example, 16 bits out of the 32 input bits appear in overlap at the output. K composed by the key is mode 2 added to the output. The resulting 48 bits are divided into eight 6-bit blocks and the respective 6 bits are converted to 4 bits by $s_1, s_2, \ldots s_8$, respectively. Assuming that the 6 bits constitute one character, it may be considered as a type of replacement. However, since the output is compressed to 4 bits, the conversion is irrevocable. Accordingly, the fK(R) is generally an irrevocable function. This, however, does not mean that the conversion of the formula (1) is irrevocable. The formula (1) may be converted as follows:

$$R_{n-1} = L_n \qquad (2)$$
$$L_{n-1} = R_n + fK_n(R_{n-1})$$
$$= R_n + fK(L_n)$$

It is thus seen that $L_{n-1}$ and $R_{n-1}$ can be calculated from $L_n$ and $R_n$.

The calculation of the formula (1) is repeated 16 times and when $L_{16}$ and $R_{16}$ are determined, they are finally transpositioned again and the encryption is terminated.

In a decoding apparatus shown in FIG. 2, a transmission data input unit 140 receives the data from the transmission line and supplies it to a decryption circuit 142. The decryption circuit 142 decrypts it by utilizing the encryption key signal outputted from the encryption key output circuit 144. In order for the decryption to be correctly performed, the exactly same encryption key as that outputted from the encryption key output circuit 130 used in the encoding apparatus (see FIG. 1) should be used.

The decryption is substantially a reverse operation to the encryption. Briefly, the process proceeds from the bottom to the top in FIG. 3. First, a reverse transposition to the last transposition in the encryption is made, and $R_{n-1}$ and $L_{n-1}$ are determined from the formula (2), and when $R_0$ and $L_0$ are determined, a reverse transposition to the first transposition in the encryption is made. In this manner, the original 64 bits are reproduced. In order to decrypt the DES encrypted text, there is no known method other than examining the keys one by one. Assuming that one microsecond is needed to examine if one key is correct one or not, 2,283 years is needed to examine all of $2^{56}$ keys.

The transmission data decrypted by the decryption circuit 142 is separated by a separation circuit 146 to encoded data of the SD signal and encoded data of the auxiliary video signal, which are supplied to decoding circuits 148 and 150, respectively. The decoding circuit 148 outputs the reproduced SD signal and the decoding circuit 150 output the reproduced auxiliary video signal.

An SD A/D conversion circuit 152 converts the digital SD signal outputted from the decoding circuit 148 to an analog signal. The output of the SD A/D conversion circuit 152 is an analog video signal having 525 scan lines and the frame frequency of 30 Hz. This video signal is applied to a monitor device of an ordinary resolution to display the image.

An SD/HD conversion circuit 154 converts the digital SD signal outputted from the decoding circuit 148 to a digital HD signal in the same process as that of the SD/HD conversion circuit 120. An adder 156 adds the output of the decoding circuit 150 and the output of the SD/HD conversion circuit 154. The output of the adder 156 is a video signal corresponding to the high resolution video signal. An HD D/A conversion circuit 158 converts the digital output of the adder 156 to an analog signal. The output of the HD D/A converter 158 is a video signal having 1,050 scan lines and the frame frequency of 30 Hz. The video signal is applied to a high resolution monitor to display the image.

The above prior art video signal encoding and decoding apparatus has a problem in that the video signal cannot be reproduced for those who do not have the encryption key, for both the low resolution video signal and the high resolution video signal.

There is a demand that charges to users are discriminated between the low resolution display device having 525 scan lines and the high resolution display device having 1,050 scan lines, for the same content, but the prior art apparatus does not meet the requirement.

SUMMARY OF THE INVENTION

It is an object of the present invention to provide an image processing apparatus which permits the reproduction as usual for an image having a lower resolution than a predetermined level and permits the reproduction of an image having a higher resolution by conducting a predetermined process.

To achieve the above object, in one preferred embodiment, the image processing apparatus comprises separation means for separating input image data into low resolution image data and one or more auxiliary image data for interpolating the low resolution image data, and encryption means for encrypting at least one auxiliary data.

In another preferred embodiment, the image processing apparatus for separating the input image data into the low resolution image data and the one or more auxiliary image data for interpolating the low resolution image data and decoding the image data having at least one auxiliary image data encrypted comprises decryption means for decrypting the encrypted auxiliary image data, and synthesization means for synthesizing the low resolution image data and the auxiliary image data.

Other objects, features and advantages of the invention will become apparent from the following detailed description taken in conjunction with the accompanying drawings.

DETAILED DESCRIPTION OF THE PREFERRED EMBODIMENTS

Figure 5:
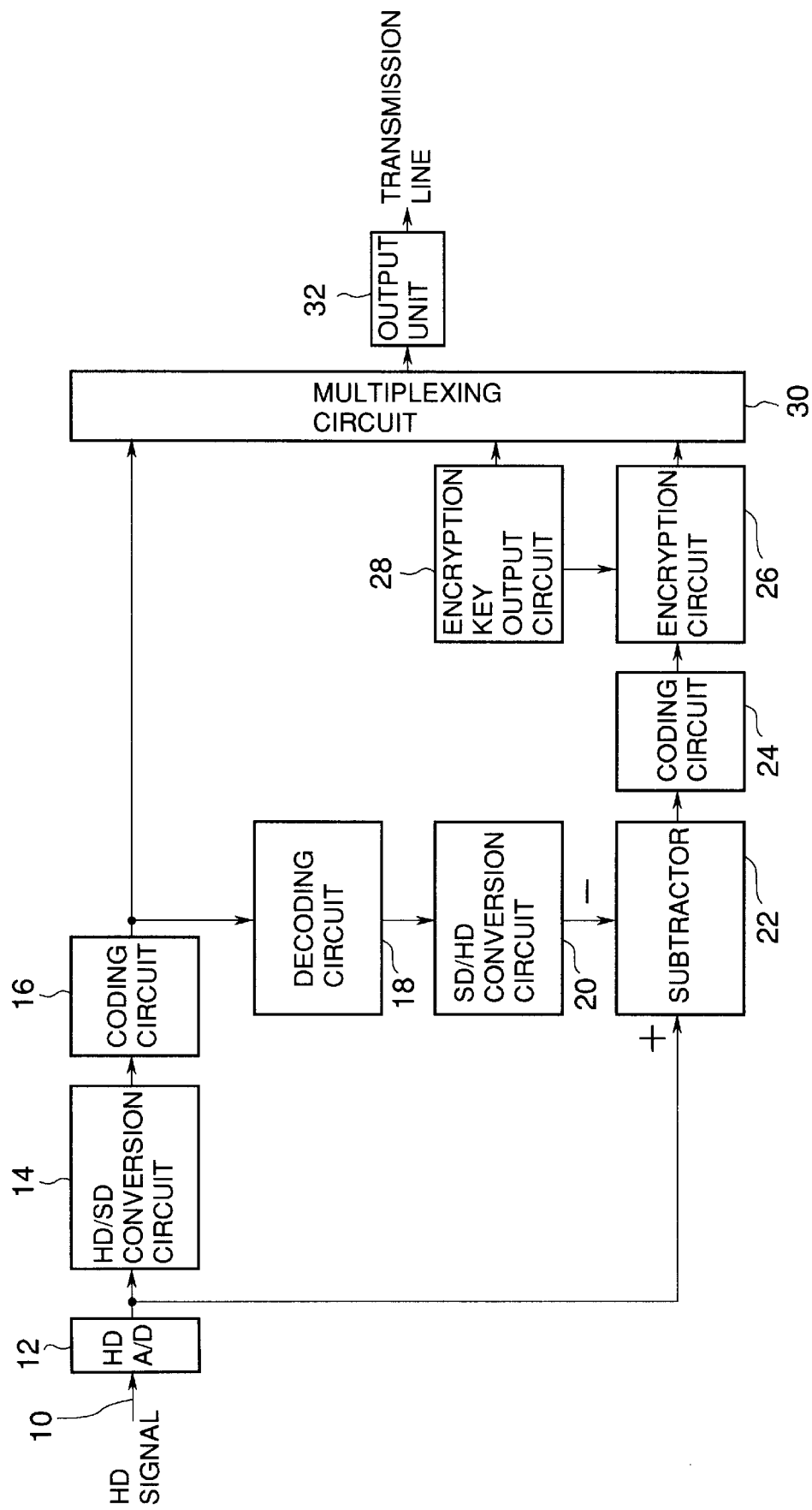
FIG. 5 is a block diagram of a configuration of one embodiment of an image encoding apparatus of the present invention.
Figure 6:
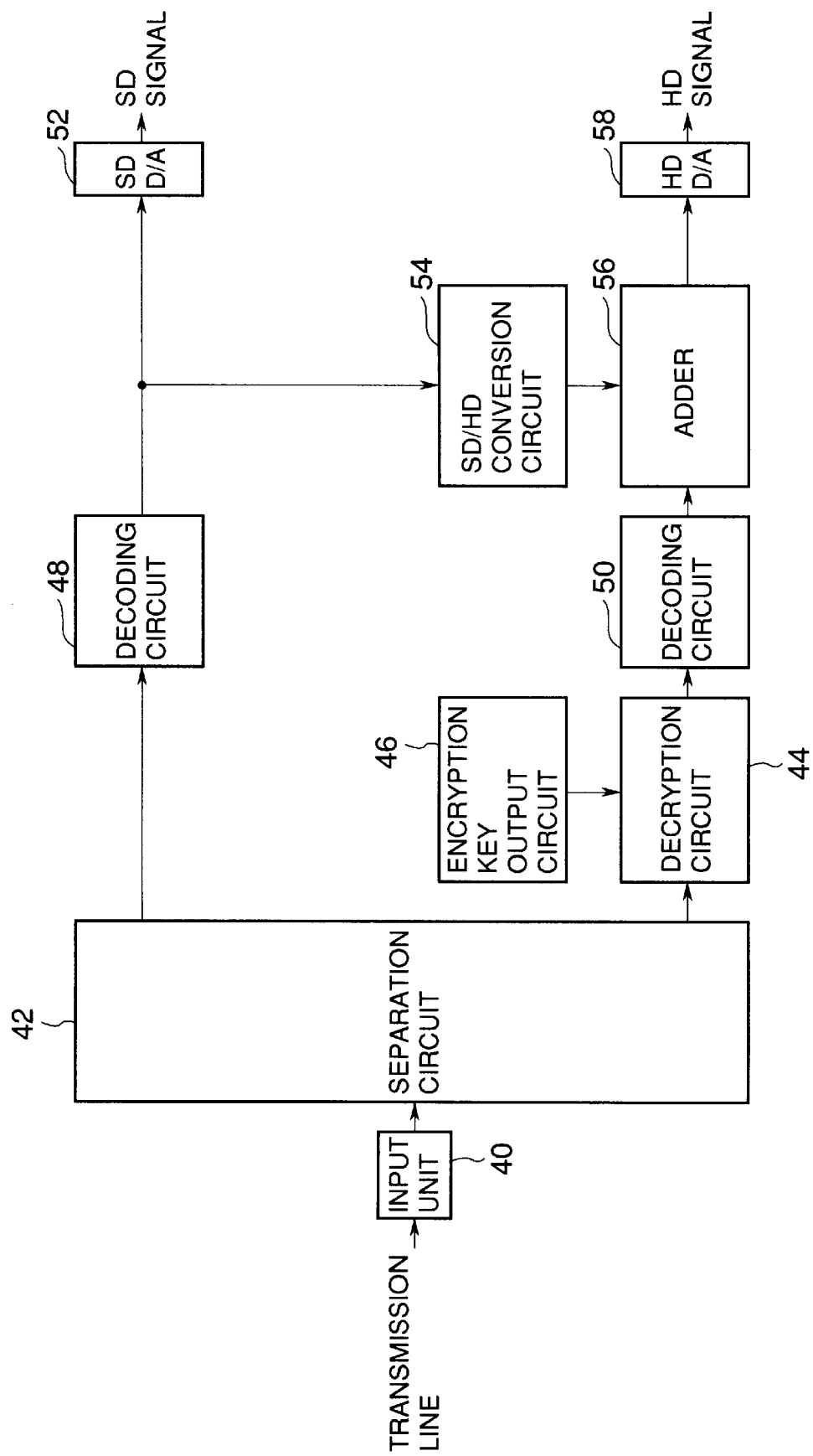
FIG. 6 is a block diagram of a configuration of an embodiment of an image decoding apparatus of the present invention.

FIG. 5 is a block diagram of a configuration of one embodiment of the encoding apparatus of the present invention, and FIG. 6 is a block diagram of a configuration of the decoding apparatus.

The encoding apparatus shown in FIG. 5 is first described. Numeral 10 denotes a high resolution video signal having 1,050 scan lines and the frame frequency of 30 Hz as does the HD signal 110. Numeral 12 denotes an HD A/D conversion circuit for converting the video signal 10 to a digital signal, numeral 14 denotes a high resolution (HD)/ordinary resolution (SD) conversion circuit for converting the digital HD signal outputted from the HD A/D conversion circuit 12 to a video signal of the ordinary resolution, numeral 16 denotes an encoding circuit for efficiently encoding the output of the conversion circuit 14, numeral 18 denotes a decoding circuit for decoding the output of the encoding circuit 16, numeral 20 denotes an SD/HD conversion circuit for interpolating the SD signal output of the decoding circuit 18 to convert it to an HD signal, numeral 22 denotes a subtractor for subtracting the output of the SD/HD conversion circuit 20 from the output of the HD A/D conversion circuit 12 for each pixel, and numeral 24 denotes an encoding circuit for encoding the output of the subtractor 22. The circuits 12–24 have the same functions as those of the circuits 112–124 of FIG. 1 and operate in the same manner.

Numeral 26 denotes an encryption circuit for encrypting the output of the encoding circuit 24 in accordance with an encryption signal outputted from an encryption key output circuit 28. As the encryption technique, the one which complies with the DES standard is used.

Numeral 30 denotes a multiplexing circuit for multiplexing the output of the encoding circuit 16 and the encryption circuit 26, and numeral 32 denotes an output unit for outputting transmission data multiplexed by the multiplexing circuit 30 to a transmission line such as a communication line or a recording medium.

The encoding apparatus shown in FIG. 5 is now described. The operations of the circuits 12–24 are the same as those of the prior art apparatus. Namely, the encoding circuit 16 outputs the encoded data of the video signal derived by converting the HD signal 10 to the ordinary resolution, and the encoding circuit 24 outputs the encoded data of the auxiliary video signal to reproduce the high resolution video signal from the transmission video data of the ordinary resolution. In the present embodiment, prior to the multiplexing of the both encoded data, the output encoded data of the encoding circuit 24 is encrypted by the encryption circuit 26 by using the encryption key signal outputted from the encryption key output circuit 28 and it is applied to the multiplexing circuit 30.

Accordingly, in the present embodiment, the multiplexing circuit 30 multiplexes the encoded data of the video signal of the ordinary resolution (the output of the encoding circuit 16) and the encoded data of the encrypted auxiliary video signal and the output unit 32 outputs the output of the multiplexing circuit 30 to the transmission line. Accordingly, the video signal of the ordinary resolution is transmitted without encryption and the information for reproducing the high resolution video signal (auxiliary video signal) is encrypted so that, in the receiving station, the high resolution video signal cannot be reproduced without the encryption key and the video signal of the ordinary resolution can be reproduced without the encryption key.

The decoding apparatus shown in FIG. 6 is now described. Numeral 40 denotes a transmission data input unit for receiving data from the transmission line, numeral 42 denotes a separation circuit for separating a set stream from the transmission data input unit 40 to a portion related to the encoded data of the SD signal and a portion related to the encoded data of the auxiliary video signal, and numeral 44 denotes a decryption circuit for decrypting the encoded data of the auxiliary video signal from the separation circuit 42 by referencing the encryption key signal outputted from the encryption key output circuit 46.

Numeral 48 denotes a decoding circuit for decoding the encoded data of the SD signal from the separation circuit 42, numeral 50 denotes a decoding circuit for decoding the encoded data of the auxiliary video signal from the decryption circuit 44, numeral 52 denotes an SD D/A conversion circuit for converting the digital SD signal outputted from the decoding circuit 48 to an analog signal, numeral 54 denotes an SD/HD conversion circuit for converting the digital SD signal outputted from the decoding circuit 48 to a digital HD signal in the same process as that of the SD/HD conversion circuit 20, numeral 56 denotes an adder for adding the output of the decoding circuit 50 to the output of the SD/HD conversion circuit 54, and numeral 58 denotes an HD D/A conversion circuit for converting the digital output of the adder 56 to an analog signal.

Figure 1:
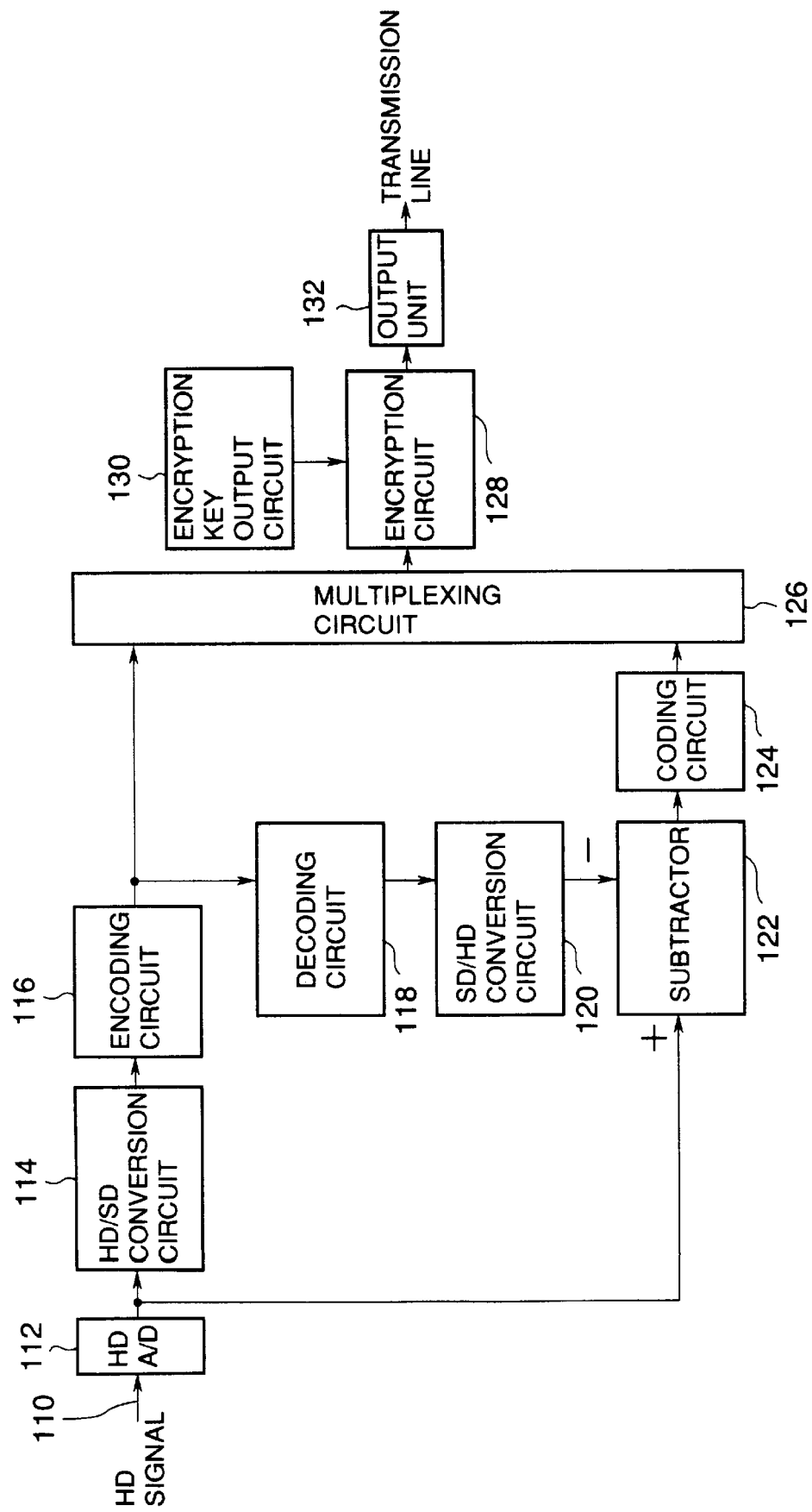
FIG. 1 is a block diagram of a prior art image encoding apparatus.
Figure 2:
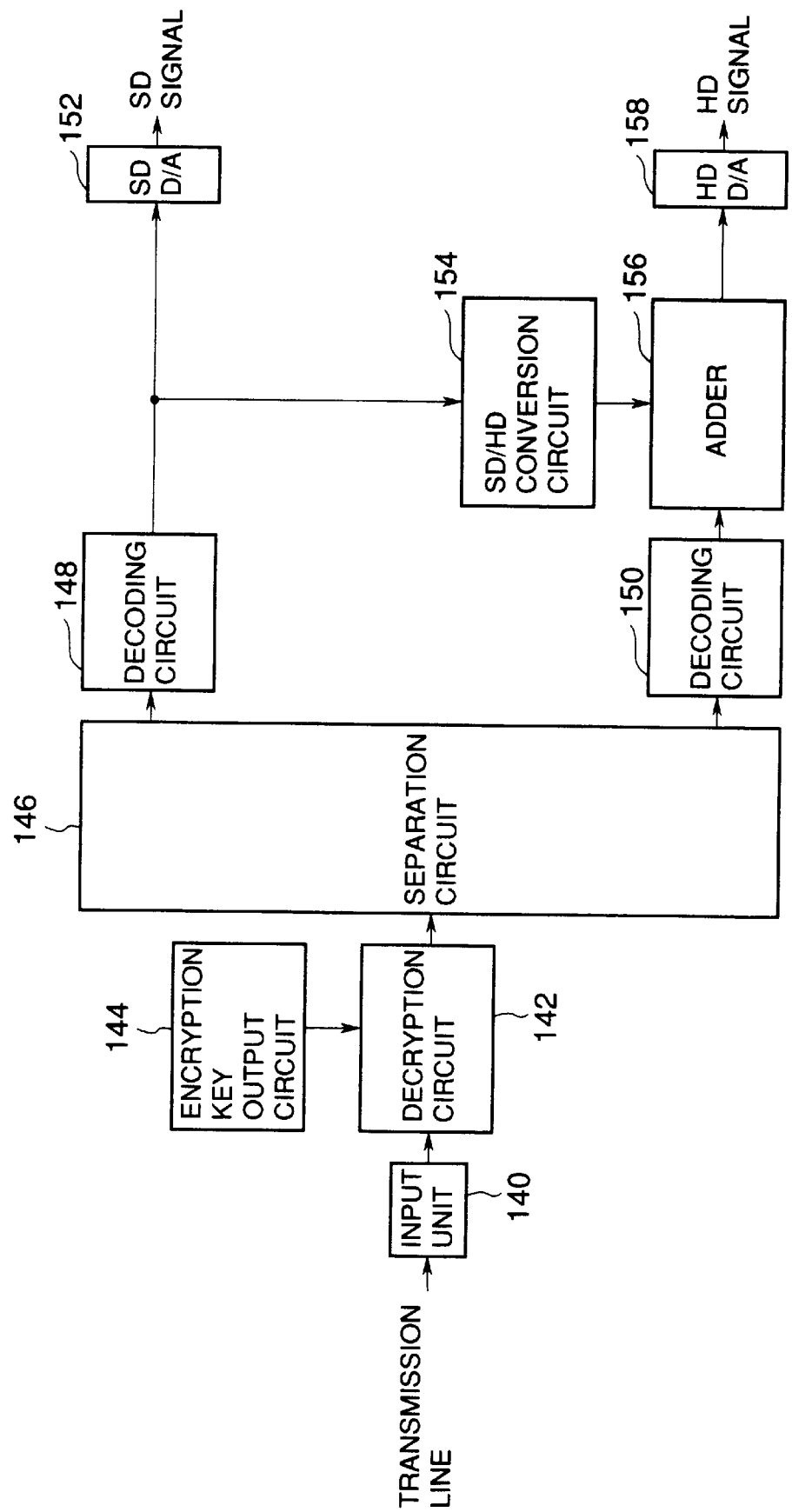
FIG. 2 is a block diagram of a prior art image decoding apparatus.
Figure 3:
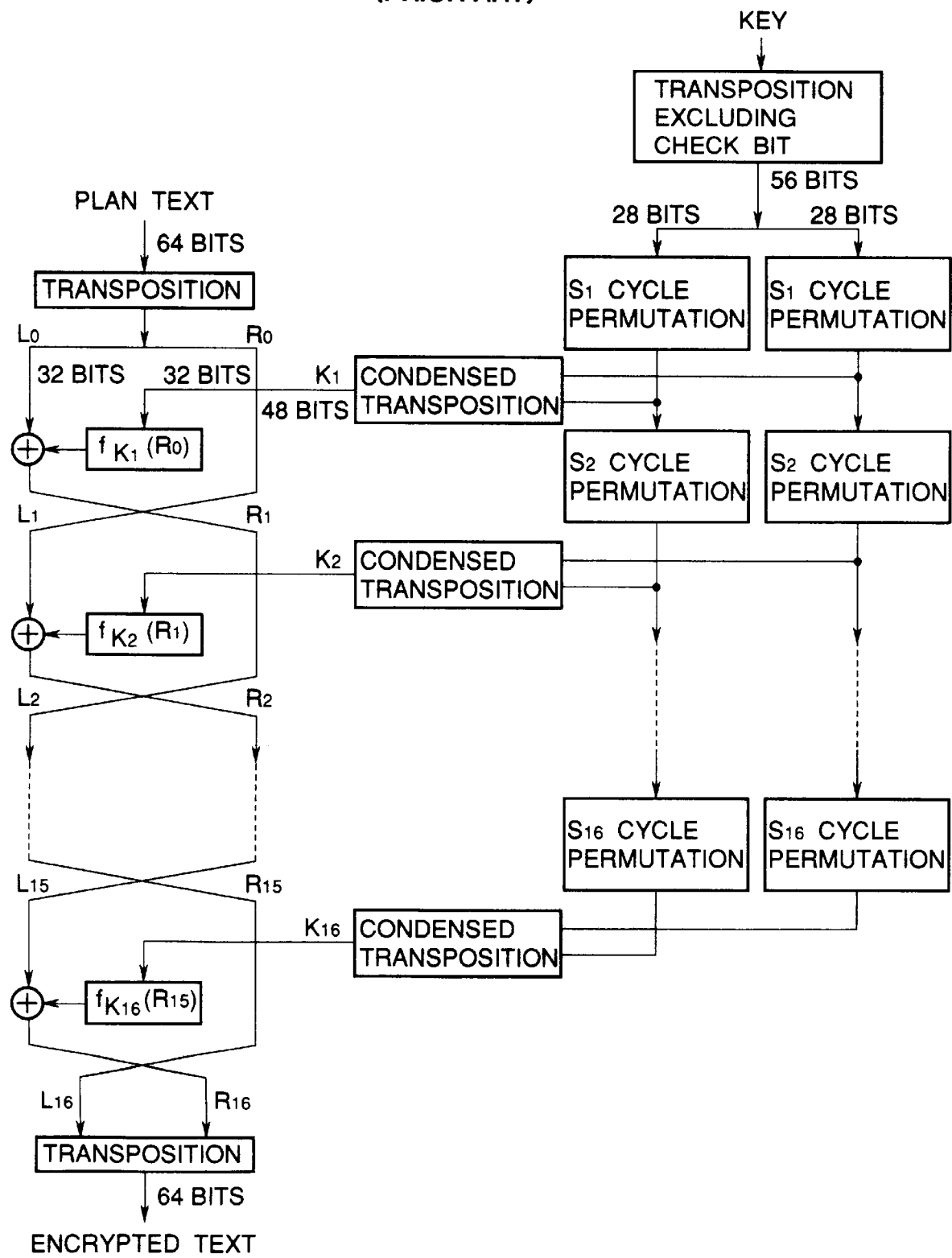
FIG. 3 is a flow chart of prior art encryption.
Figure 4:
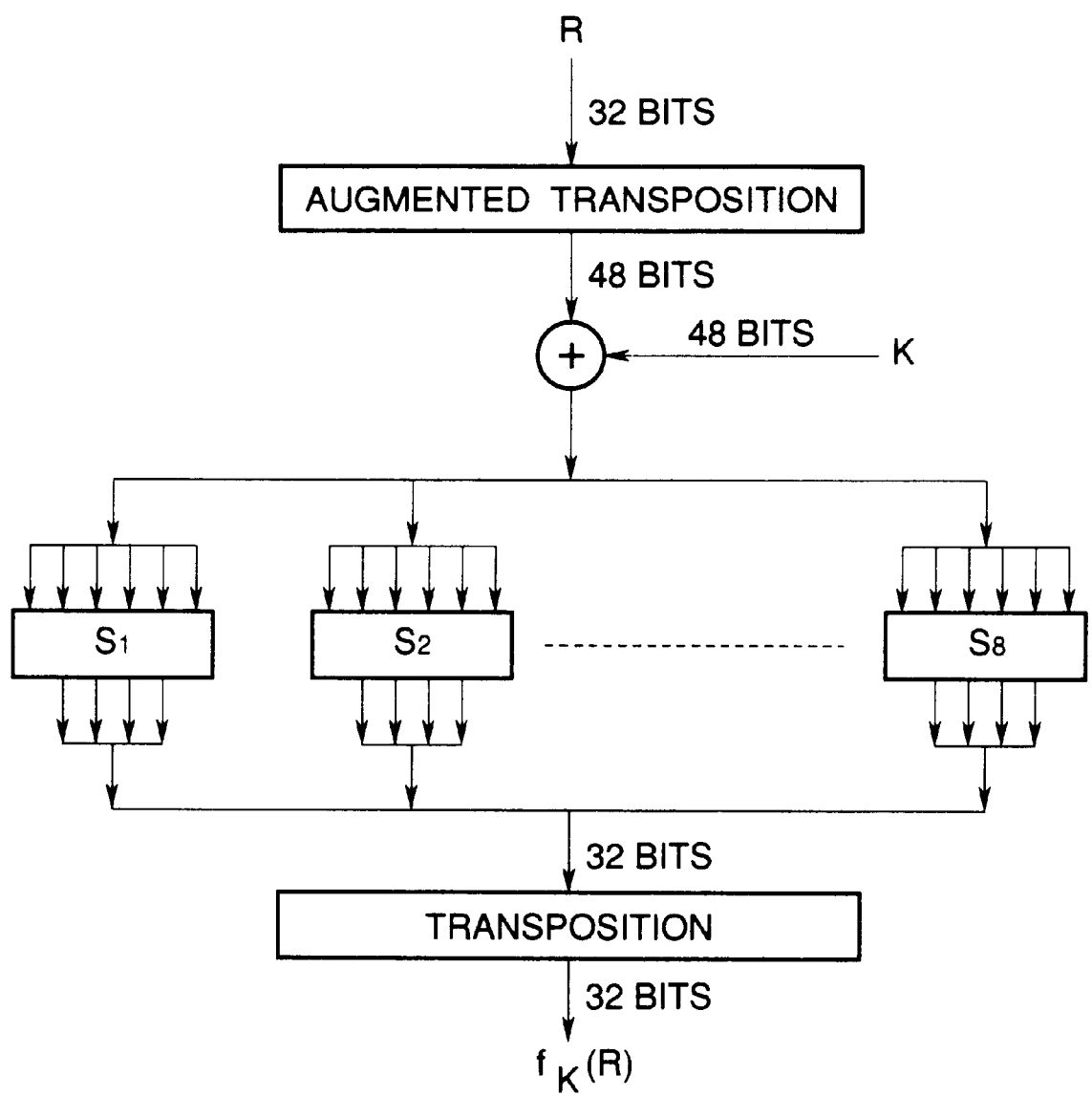
FIG. 4 is a flow chart of prior art decryption.

The operation of the decoding circuit shown in FIG. 6 is now described. The transmission data input unit 40 receives the data from the transmission line and supplies it to the separation circuit 42, and the separation circuit 42 separates it to a portion related to the encoded data of the SD signal and a portion related to the encoded data of the encrypted auxiliary video signal and supplies the former to the decoding circuit 48 and the latter to the decryption circuit 44. The decryption circuit 44 decrypts the encryption applied to the encoded data of the auxiliary video signal by using the same encryption key signal outputted from the encryption key output circuit 46 as the encryption key signal outputted from the encryption key output circuit 28 of the encoding circuit (FIG. 1). The encoded data of the auxiliary video signal decrypted by the decryption circuit 44 is applied to the decoding circuit 50 and decoded thereby.

Thus, the decoding circuit 48 outputs the reproduced digital SD signal and the decoding circuit 50 outputs the reproduced digital auxiliary video signal.

The SD D/A conversion circuit 52 converts the digital SD signal outputted from the decoding circuit 48 to an analog signal. The SD D/A conversion circuit 52 may be an analog signal having 525 scan lines and the frame frequency of 30 Hz and the video signal is applied to a monitor device of the ordinary resolution to display the image.

The SD/HD conversion circuit 54 converts the digital SD signal outputted from the decoding circuit 48 to a digital signal in the same process as that of the SD/HD conversion circuit 120. The adder 56 adds the output of the decoding circuit 50 to the output of the SD/HD conversion circuit 54 for each pixel. The output of the adder 56 is a video signal corresponding to the high resolution video signal. The HD D/A conversion circuit 58 converts the digital output of the adder 56 to an analog signal. The output of the HD D/A conversion circuit 58 is a high resolution video signal having 1,050 scan lines of and the frame frequency of 30 Hz and it may be applied to a high resolution monitor to display the image.

In the decoding apparatus shown in FIG. 6, without the encryption key or if the encryption key is not correct (hereinafter collectively referred to as without key or no key state), the decryption circuit 44 outputs a quite an unstable data pattern so that the output of the HD D/A conversion circuit 58 is also unstable and an unstable pattern such as a noise image is displayed on the screen of the display device such as a CRT.

Figure 7:
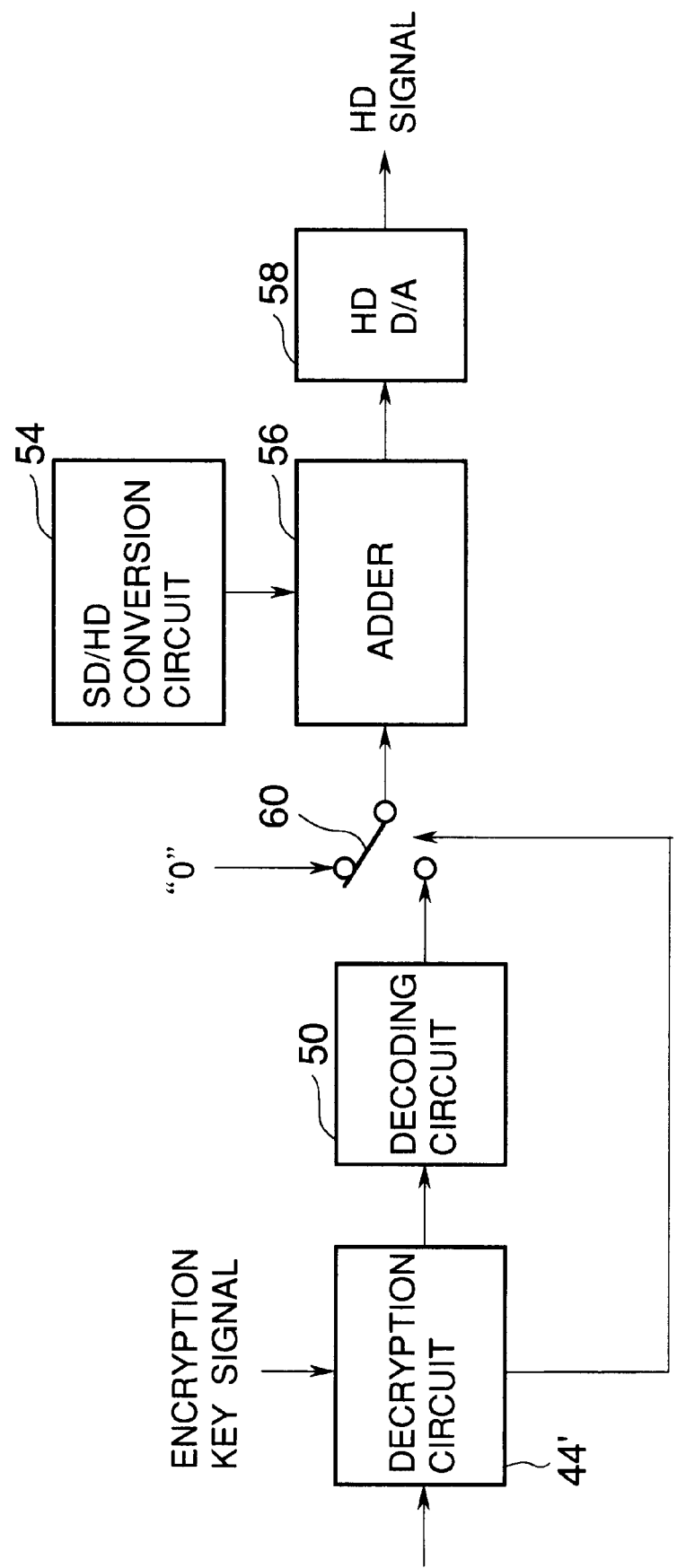
FIG. 7 is a block diagram of a modified portion of a configuration of a modified embodiment of FIG. 6.
Figure 8:
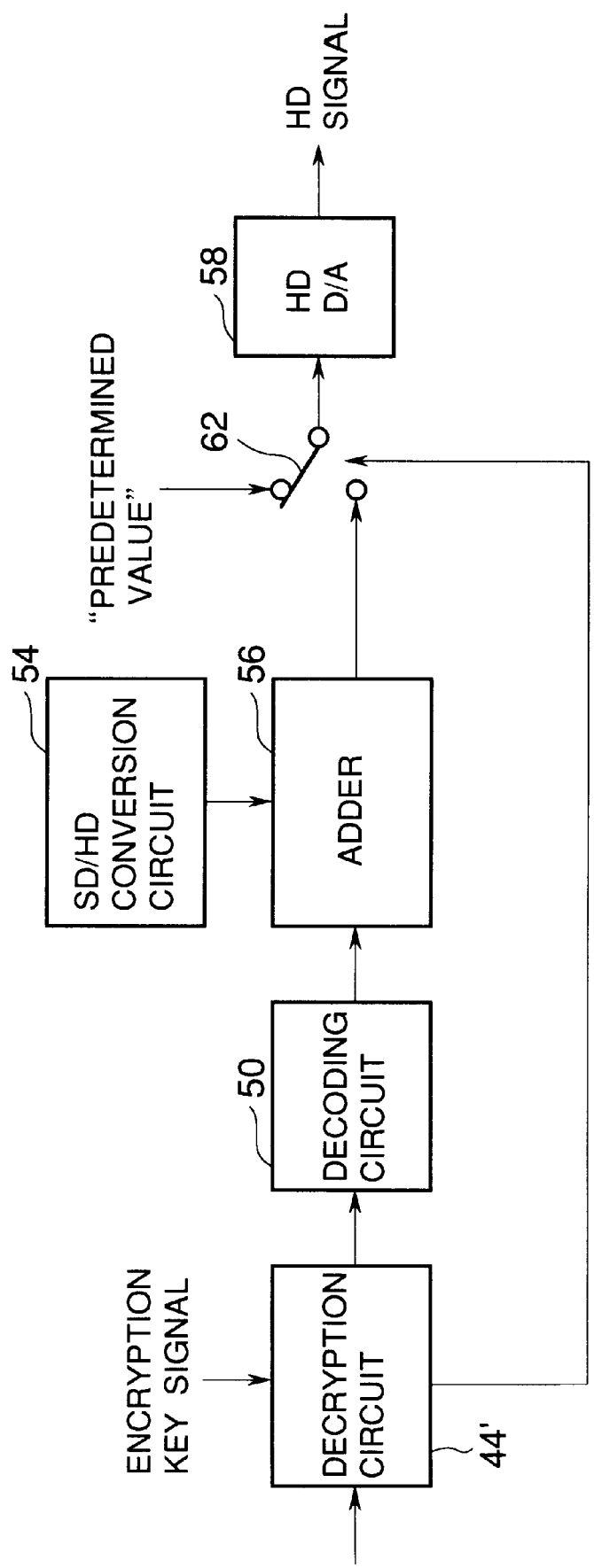
FIG. 8 is a block diagram of a modified portion of a modified embodiment of FIG. 6.

Alternatively, a fixed image may be displayed on the high resolution monitor screen in the no key state. FIGS. 7 and 8 show portions of block diagrams of such modified encoding apparatus. The like elements in FIGS. 7 and 8 are designated by like numerals.

In FIG. 7, a switch 60 is provided between the decoding circuit 50 and the adder 56, and when the no key state (no input of the encryption key signal) is detected by the decryption circuit 44, the switch 60 is set to '0' by the detection output so that '0' is applied to the adder 56. When the correct encryption key is inputted to the decryption circuit 44', the decryption circuit 44' connects the switch 60 to the output of the decoding circuit 50.

In FIG. 8, a switch 62 is provided between the adder 56 and the HD D/A conversion circuit 58 so that in the no key state a predetermined level is inputted to the HD D/A conversion circuit 58. The switch 62 normally selects the output of the adder 56, and when the decryption circuit 44' the no key state (no input of the encryption key signal), the switch is set to the predetermined level input. In this manner, when the correct input is present, the high resolution video signal is outputted and in the no key state, the predetermined level signal is outputted and an image corresponding to the predetermined level is displayed on the monitor screen.

In FIGS. 7 and 8, the switches 60 and 62 are illustrated to facilitate understanding although it is apparent that the function of such switches 60 and 62 may be incorporated in the decoding circuit 50 and/or HD A/D conversion circuit 58. Alternatively, the output of the decoding circuit 50 or the HD D/A conversion circuit may be forced to a predetermined level (for example, zero output) in response to the detection of the no key state by the decryption circuit 44.

In FIGS. 7 and 8, the no key state is detected by the decryption circuit 44 although it may be detected by error code detection or an error correction process.

Figure 9:
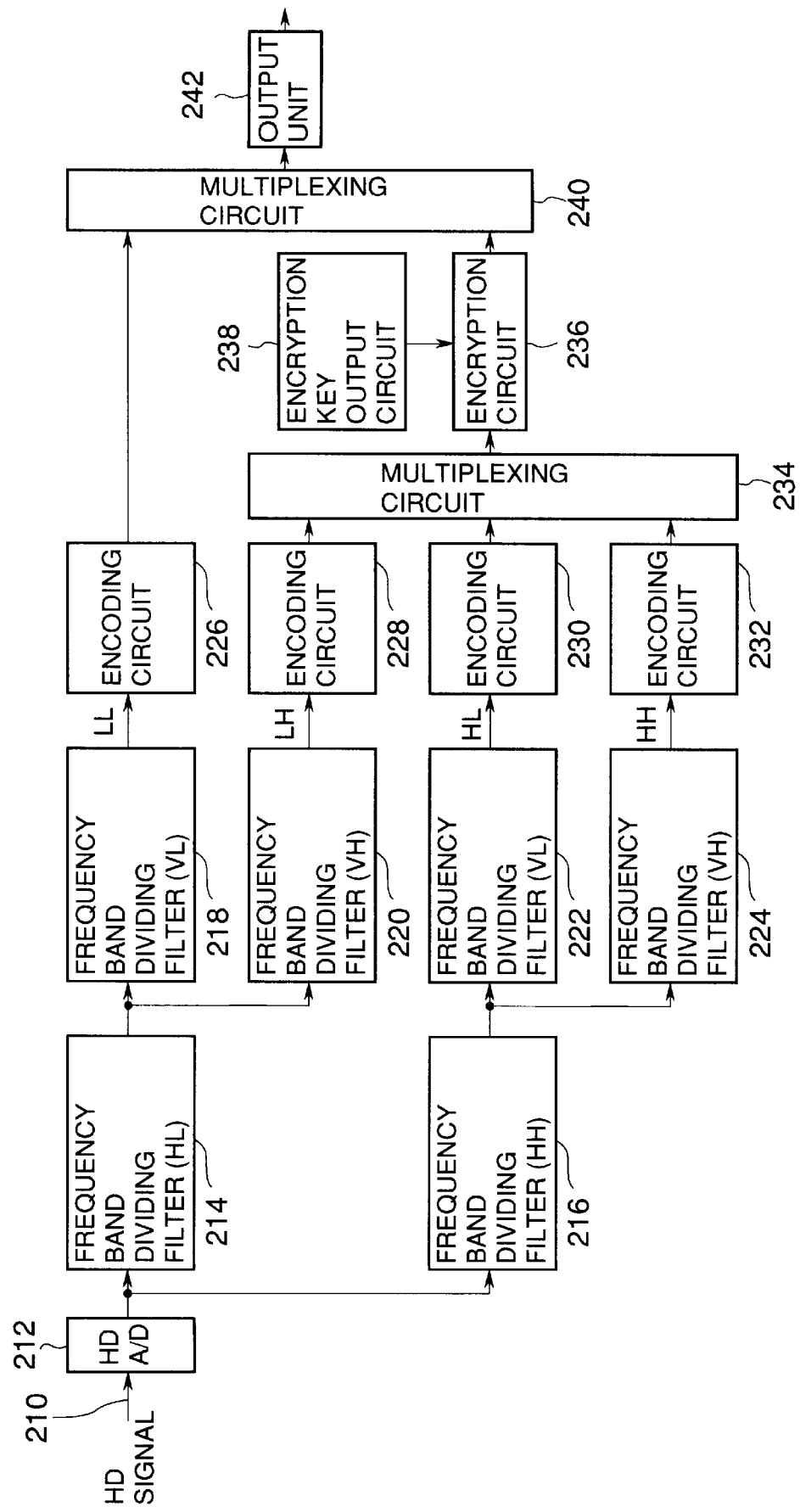
FIG. 9 is a block diagram of a configuration of a second embodiment of the image encoding apparatus of the present invention.
Figure 10:
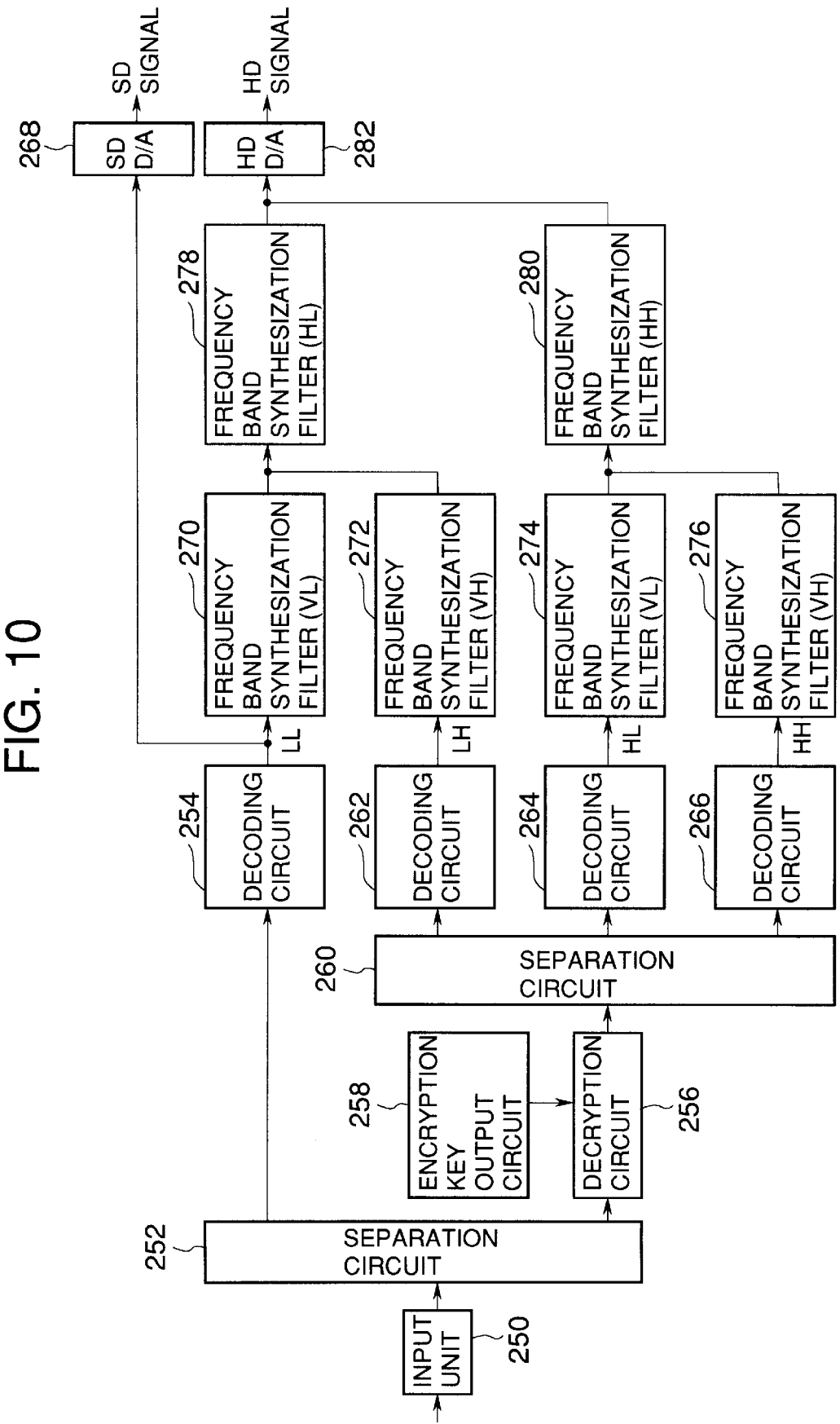
FIG. 10 is a block diagram of a configuration of a second embodiment of the image decoding apparatus of the present invention.
Figure 11:
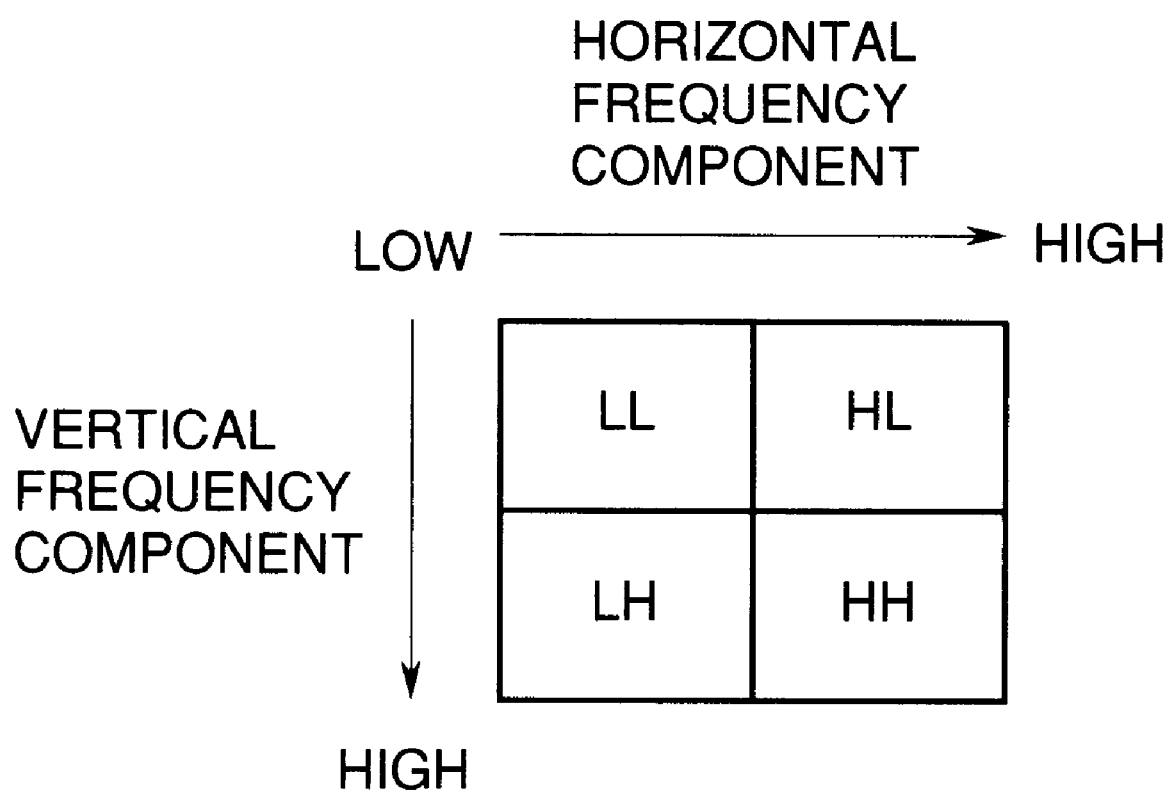
FIG. 11 illustrates band division of a space frequency.

A second embodiment of the present invention which is applied to a system in which the image information is transmitted by the band division by the space frequency is now described. FIG. 9 is a block diagram of a configuration of an encoding apparatus thereof, and FIG. 10 is a block diagram of a configuration of a decoding apparatus. FIG. 11 illustrates the band division of the space frequency.

Numeral 210 denotes an analog HD signal to be encoded. In the present embodiment, it is a video signal having 1,050 scan lines and the frame frequency of 30 Hz. An HD A/D conversion circuit 212 samples the analog HD signal at a sampling frequency of 54.054 MHz to convert it to a digital signal. The number of pixels per line of the sampled HD signal is 1,716.

The output of the HD A/D conversion circuit 212 is applied to band division filters 214 and 216 and divided by the filters 214 and 216 to a low frequency component, respectively and a high frequency component at a horizontal frequency and the number of pixels is reduced to one half.

The output of the band division filter 214 is a low resolution component of the horizontal frequency, which is further separated into a low frequency component and a high frequency component at a vertical frequency by band division filters 218 and 220, respectively to reduce the number of pixels to one half. Similarly, the band division filters 222 and 224 separates the output of the band division filter 216 (the high resolution component at the horizontal frequency) into a low frequency component and a high frequency component respectively at the vertical frequency to reduce the number of pixels to one half.

In this manner, the high resolution video signal having 1,716 pixels in the horizontal direction and 1,024 pixels in the vertical direction is separated into an LL signal (the output of the band division filter 218), an LH signal (the output of the band division filter 220), an HL signal (the output of the band division filter 222) and an HH signal (the output of the band division filter 224) having one half of the total number of pixels in the horizontal direction and the vertical direction, as shown in FIG. 11. Since only the LL signal has the low-pass data in both the horizontal direction and the vertical direction, it is the video information which can be reproduced for display as the image and corresponds to the video signal of the ordinary resolution having 525 scan lines, the frame frequency of 30 Hz and 858 pixels per line. On the other hand, since the LH signal, the HL signal and the HH signal are high-pass data, they cannot be displayed as the image as they are and they are the auxiliary video signals which form the high resolution video signal in cooperation with the LL signal.

The encoding circuit 226 efficiently encodes the output of the band division filter 218 (LL signal) by an encoding scheme which is a combination of the motion compensated adaptive prediction known as the CCIR Recommendation 723 and the DCT. Encoding circuit 228, 230 and 232 efficiently encode the outputs of the band division filters 220, 222 and 224 (LH signal, HL signal and HH signal), respectively, by a combination of the DPCM and a zero run length encoded and variable length code. The outputs of the encoding circuits 228–232 are multiplexed by a multiplexing circuit 234. An encryption circuit 236 encrypts the output of the multiplexing circuit 234 by using the encryption key outputted from the encryption key output circuit 238 in accordance with the encryption technique of the DES standard described above.

The multiplexing circuit 240 multiplexes the output of the encoding circuit 226 and the output of the encryption circuit 236 and the output thereof is outputted to the transmission line by the output unit 242.

In the decoding apparatus shown in FIG. 10, the transmission data input unit 250 receives the transmission data from the transmission line and applies it to the separation circuit 252. The separation circuit 252 separates it into a portion related to the encoded data of the LL signal and a portion related to the other LH, HL and HH signals, and applies the former to the decoding circuit 254 and the latter to the decryption circuit 256. The decryption circuit 256 decrypts the encoded data of the LH, HL and HH signals by using the encryption key signal outputted from the encryption key output circuit 258. In order to correctly decrypt it, the encryption key should be same as that used for encoding the encryption key signal.

The separation circuit 260 separates the output of the decryption circuit 256 to the encoded data of the LH signal, the encoded data of the HL signal and the encoded data of the HH signal, which are applied to the decoding circuits 262, 264 and 266, respectively.

The decoding circuits 254, 262, 264 and 266 decode the encoded data inputted thereto, respectively. The output of the decoding circuit 254 is the LL signal. The SD D/A conversion circuit 268 converts the output of the decoding circuit 254 to an analog signal. The output of the SD D/A conversion circuit 268 is an analog video signal having the number of scan lines of 525 and the frame frequency of 30 Hz and it is displayed as an image by an image display device of the ordinary resolution.

The reproduced LL signal and LH signal are combined at the vertical frequency by the band synthesization filters 270 and 272 and the number of pixels in the vertical direction is interpolated to two times. Similarly, the reproduced HL signal and HH signal are synthesized at the vertical frequency by the band synthesization filters 274 and 276 and the number of pixels in the vertical direction is interpolated to two times. The synthesized signals are combined at the horizontal frequency by the band synthesization filters 278 and 280 and the number of pixels in the horizontal direction is interpolated to two times.

By those synthesization processes, the digital high resolution video signal having 1,050 scan lines and the frame frequency of 30 Hz is reproduced. The HD D/A conversion circuit 282 converts the reproduced digital HD signal to an analog signal.

In the decoding apparatus shown in FIG. 10, in the no key state, the decryption circuit 256 outputs a quite unstable data pattern so that the output of the HD D/A conversion circuit 282 is also unstable and an unstable pattern such as a noise image is displayed on the screen of the display device such as CRT.

Figure 12:
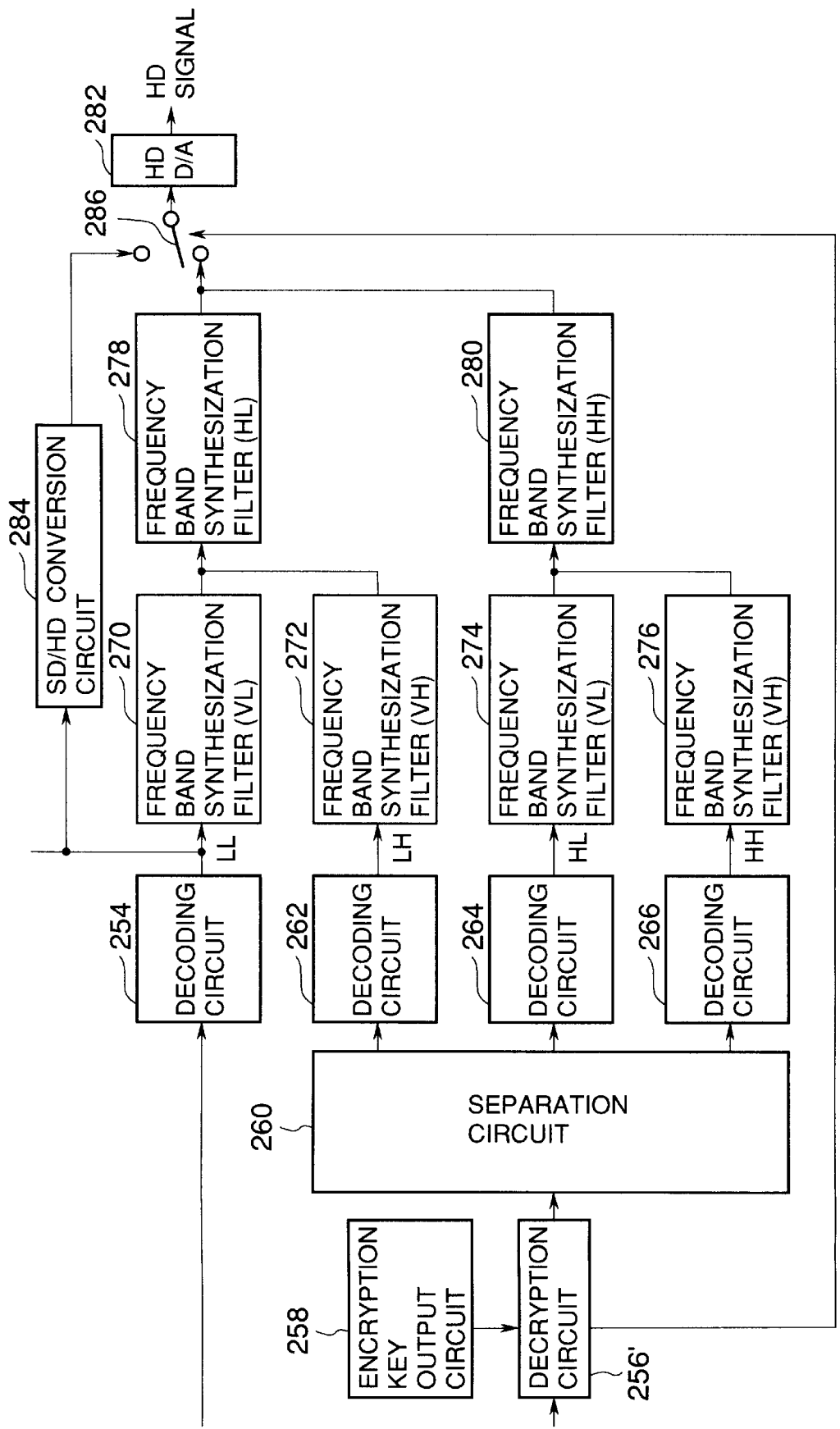
FIG. 12 is a block diagram of a configuration of a modified portion of a modified embodiment of FIG. 10.
Figure 13:
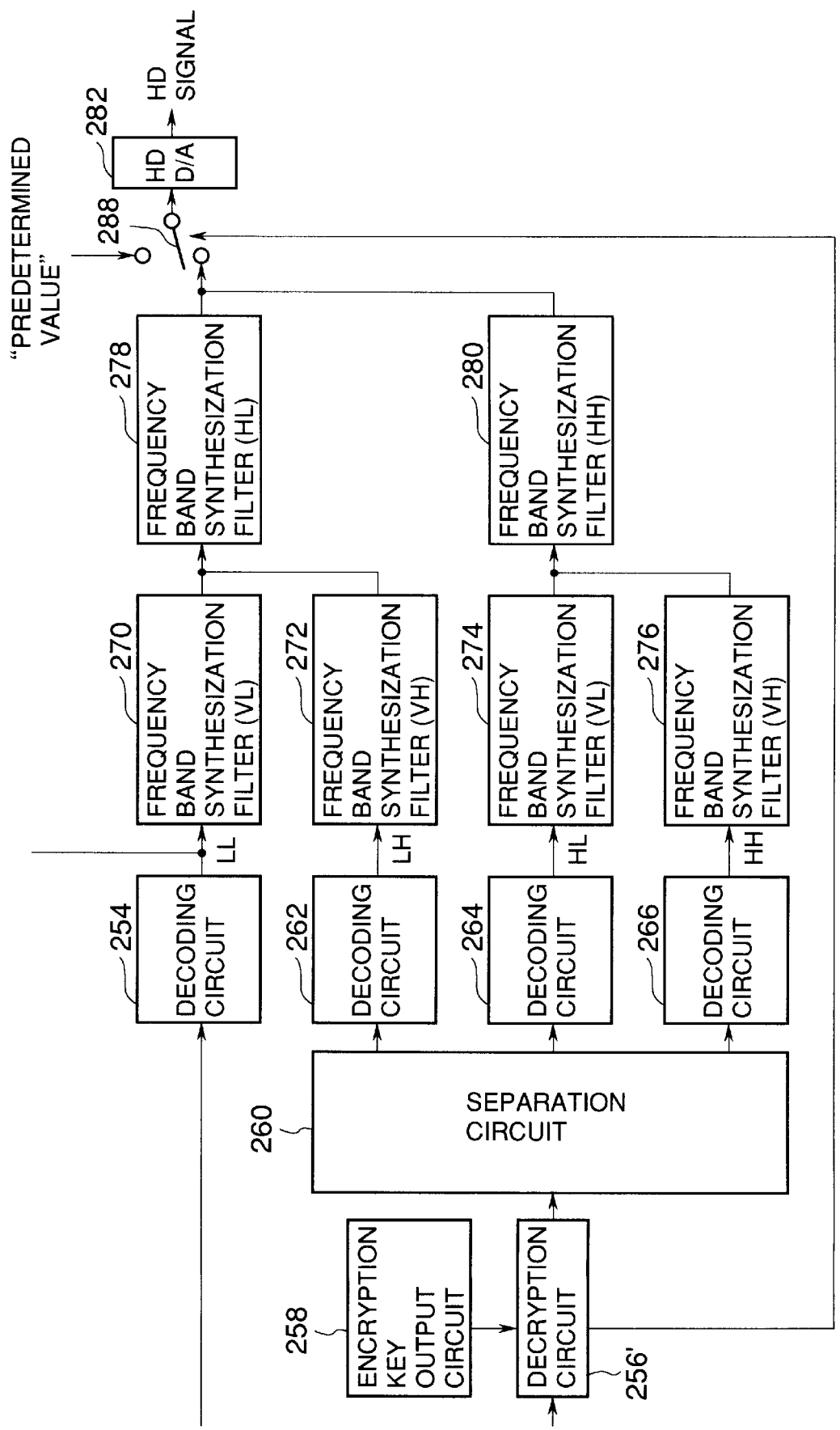
FIG. 13 is a block diagram of a configuration of a modified portion of a modified embodiment of FIG. 10.

Alternatively, the image of the low resolution or a still image may be displayed on the high resolution monitor screen in the no key state. FIGS. 12 and 13 show portions of block diagrams of such modified decoding apparatus. The like elements to those of FIG. 10 are designated by the like numerals.

In FIG. 12, an SD/HD conversion circuit 284 for converting the output of the decoding circuit 254 to the HD signal and a selection switch for selecting the output of the SD/HD conversion circuit 284 or the synthesized output by the band synthesization filters 278 and 280 and supplying it to the HD D/A conversion circuit 282 are provided. The SD/HD conversion circuit 284 is identical to the SD/HD conversion circuit 54 of FIG. 6. The switch 286 is normally connected to synthezied output of the band synthesization filters 278 and 280, and when no key state is detected by the decryption circuit, it is switched to the output of the SD/HD conversion circuit 284 by the detection output. Thus, in the no key state, the image can be displayed by the high resolution monitor although the quality of the image is not sufficient for the high resolution monitor.

When the encryption key signal is not inputted to the decryption circuit 256', it is possible that the output of the encryption key output circuit 258 is forcibly stopped or the encryption key output circuit 258 itself is not present.

For the configuration shown in FIG. 12, the high frequency data of the band synthesization filters 270–280 is reset by the detection output of the decryption circuit 256' to attain the same effect.

In FIG. 13, a switch 282 is provided between the synthesized output by the band synthesization filters 278 and 280 and the HD D/A conversion circuit 282 so that in the no key state, a predetermined level is inputted to the HD D/A conversion circuit 282. The switch 288 normally selects the synthesized output by the band synthesization filters 278 and 280, and when the no key state is detected by the decryption circuit 256, it is switched to the predetermined level input by the detection output. In this manner, when the correct encryption key is present, the high resolution video signal is outputted, and in the no key state, the predetermined level signal is outputted and the image corresponding to the predetermined level is displayed on the monitor screen.

When the encryption key signal is not inputted to the decryption circuit 256', it is possible that the output of the encryption key output circuit is forcibly stopped or the encryption key output circuit 258 itself is not present.

For the configuration shown in FIG. 13, the switch 288 may not be provided and the output of the HD D/A conversion circuit 282 may be forced to a constant level (for example, zero output) in accordance with the detection output of the no key state by the decryption circuit 44.

In FIGS. 12 and 13, the no key state is detected by the decryption circuit 256 although it may be detected by an error detection code or error correction process.

Embodiments of the encoding circuit and the decoding circuit used in the respective embodiments are now described.

Figure 14:
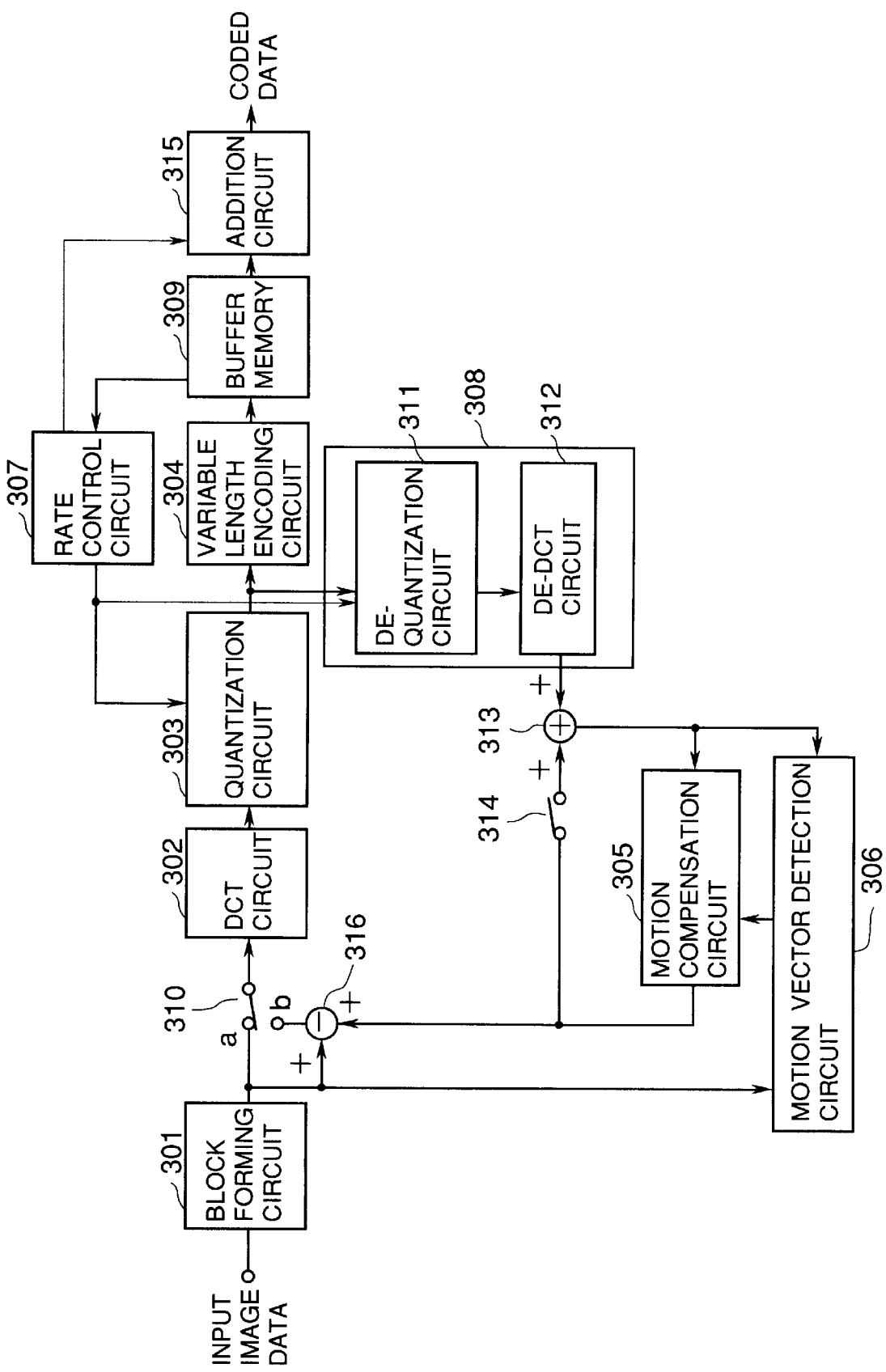
FIG. 14 is a block diagram of a specific encoding circuit of the embodiment.

FIG. 14 is a block diagram of a specific embodiment of the encoding circuit.

The encoding circuit shown in FIG. 14 comprises a blocking circuit 301, ADCT circuit 302, a quantization circuit 303, a variable length encoding circuit (VLC) 304, a motion compensation circuit 305, a motion vector detection circuit 306, a rate control circuit 307, a local decoding circuit 308 and a buffer memory 309.

In FIG. 14, image data to be encoded is grouped into 8×8 pixel blocks by the block forming circuit 301 and they are supplied to the DCT (discrete cosine transform) circuit 302 through the switch 310.

The switch 310 is periodically (for example, for each frame or every several fields) switched to a terminal a to prevent erroneous propagation.

Namely, when it is connected to the terminal a, an intra-frame or intra-field encoding (intra mode) is conducted.

In the intra mode, it is DCT-transformed by the DCT circuit 302 and the resulting DCT coefficient is quantized by the quantization circuit 303 and further encoded by the variable length encoding circuit 304 and temporarily stored in the buffer 309.

On the other hand, in other than the intra mode, the switch 310 is connected to a terminal b to conduct the motion compensated prediction encoding.

Numerals 311 and 312 denote a de-quantization circuit and a de-DCT circuit which constitute the local decoding circuit 308. The data quantized by the quantization circuit 303 is restored to the original image data by the local decoding circuit 308.

Numeral 313 denotes an adder, numeral 314 denotes a switch which is closed in other than the intra mode, and numeral 316 denotes a subtractor.

The locally decoded image data refers the motion vector detected by the motion vector detection circuit 306 to output the corresponding block of the predetermined frame (preceding frame, succeeding frame or interpolated frame).

The output of the motion compensation circuit 305 is subtracted by the input image data by the subtractor 316 to produce a difference.

The difference is encoded by the DCT circuit 302, the quantization circuit 303 and the variable length encoding circuit 304 and it is stored in the buffer 309.

The motion vector detection circuit 306 compares the frame data to be encoded with the predetermined reference frame data to produce the motion vector, and the output of the motion vector detection circuit 306 is supplied to the motion compensation circuit 305 to specify the block to be outputted by the motion compensation circuit 305.

The rate control circuit 307 controls the quantity of encoding by switching the quantization step of the quantization circuit 303 in accordance with an occupation rate of the encoded data in the buffer 309.

Finally, the motion vector data detected by the motion vector detection circuit 306, an encoding identification code for identifying the intra mode and quantization step data indicating the quantization step are added by an adding circuit 315 and it is outputted as the encoded data.

Figure 15:
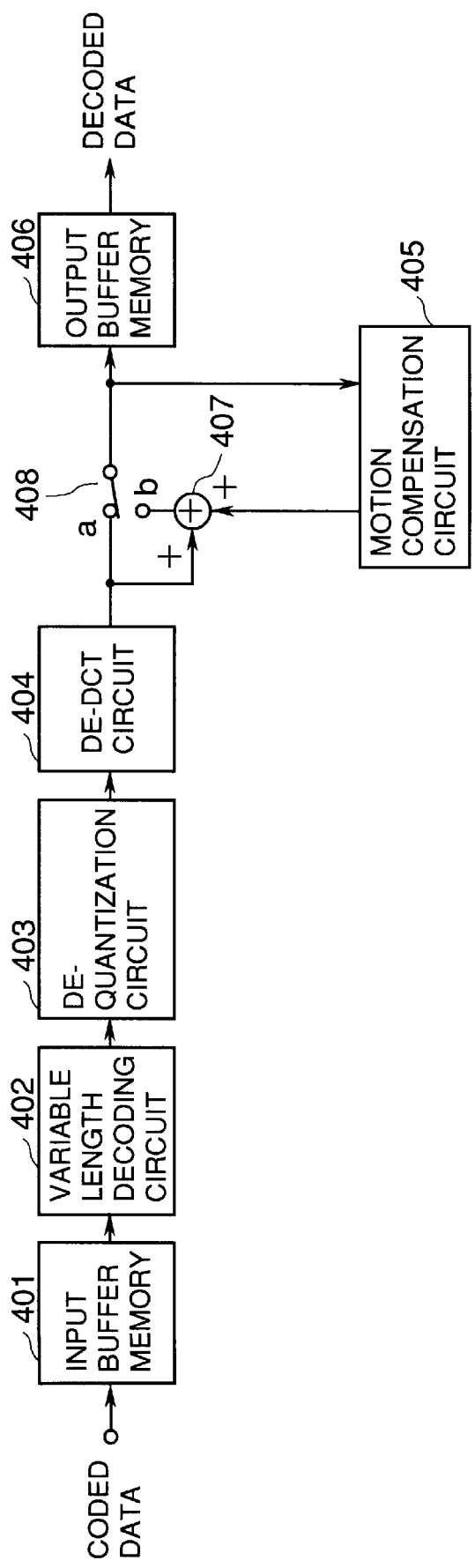
FIG. 15 is a block diagram of a specific decoding circuit of the embodiment.

FIG. 15 is a specific block diagram of the decoding circuit.

The decoding circuit basically operates in the reverse manner to the encoding circuit shown in FIG. 14.

The decoding circuit shown in FIG. 15 comprises an input buffer memory 401, a variable length decoding circuit 402, a de-quantization circuit 403, a de-DCT circuit 404, a motion compensation circuit 405 and an output buffer memory 406.

The encoded data sequentially read from the input buffer memory 401 is processed by the variable length decoding circuit 402, the de-quantization circuit 403 and the de-DCT circuit 404 and converted to the space area data.

The quantization step of the de-quantization circuit 403 is determined by the quantization step data which is transmitted along with the encoded data.

Numeral 407 denotes an adder for adding the output of the de-DCT circuit 404 to the difference outputted from the motion compensation circuit 405, and numeral 408 denotes a switch for selecting the output of the de-DCT circuit 404 or the output of the adder 407.

The switch 408 is connected to the terminal a in the intra mode by the encoding identification code detected by the data detection circuit, not shown, and connected to the terminal b in the other mode.

The decoded data is temporarily stored in the output buffer memory 406 and restored to the original space arrangement and outputted as one-frame or one-field image data.

As will be readily understood from the above description, in accordance with the present embodiment, the high resolution video signal is not reproduced for those who do not have the encryption key and the reproduction of only the low resolution video signal is permitted. The charges to the users may be discriminated between the display device of the low resolution and the display device of the high resolution of the same content.

The present invention may be implemented in other various forms without departing from the spirit and and scope of the invention.

For example, while the image signal is divided into four frequency bands in the second embodiment, the present invention is not limited thereto.

In other words, the foregoing description of the embodiments has been given for illustrative purpose only and is not to be construed as imposing limitation in any respect.

The scope of the invention is, therefore, to be determined solely by the following claims and not limited by the text of the specification and alterations made within the true spirit and scope of the invention.

What is claimed is:

1. An image processing apparatus comprising:

input means for inputting an image signal;

division means for dividing the image signal inputted from said input means into a plurality of frequency band signal groups;

encoding means for encoding the signal groups by using an orthogonal transform to provide encoded signals; and encrypting means for encrypting at least one of the encoded signals.

2. An image processing apparatus according to claim 1, further comprising:

multiplexing means for multiplexing the encoded signal groups.

3. The image processing apparatus according to claim 1, wherein the frequency band signal groups are signal groups having predetermined spatial frequency components.

4. An image processing apparatus comprising:

input means for inputting an image signal;

conversion means for converting the image signal inputted from said input means into a plurality of converted image signals of different resolutions;

encoding means for encoding the converted image signals by using an orthogonal transform; and encryption means for encrypting at least one of the converted image signals encoded by said encoding means.

5. An image processing apparatus according to claim 4, further comprising:

multiplexing means for multiplexing the encoded image signals.

6. An image processing apparatus for decrypting signal groups that were previously formed by encoding a plurality of frequency band signal groups by using an orthogonal transform to provide encoded signal groups, and by encrypting at least one of the frequency signal groups to provide at least one encrypted signal group, the frequency band signal groups having been generated from an image signal, said apparatus comprising:

decryption means for decrypting the at least one encrypted signal group to provide at least one decrypted signal group;

decoding means for decoding the encoded signal groups including the at least one decrypted signal group; and producing means for producing an image signal by using the at least one decoded decrypted signal group.

7. An image processing apparatus according to claim 6, wherein the output of the encrypted signal group is inhibited when said decryption means cannot decrypt the encrypted signal group.

8. The image processing apparatus according to claim 6, wherein the frequency band signal groups are signal groups having predetermined spatial frequency components.

9. An image processing apparatus for decrypting signal groups that were previously formed by dividing an image signal into a plurality of frequency band signal groups and by encrypting at least one of the frequency band signal groups to provide at least one encrypted signal group, comprising:

decryption means for decrypting the at least one encrypted signal group to provide at least one decrypted signal group; and synthesization means for synthesizing the at least one decrypted signal group with other signal groups, wherein a predetermined signal is produced in lieu of the at least one encrypted signal group when said decryption means cannot decrypt the at least one encrypted signal group.

10. The image processing apparatus according to claim 9, wherein the frequency band signal groups are signal groups having predetermined spatial frequency components.

11. An image processing apparatus for decrypting image signals that were previously formed by encoding a plurality of image signals of different resolutions by using an orthogonal transform to provide encoded image signals and by encrypting at least one of the image signals of different resolution to provide at least one encrypted image signal, comprising:

decryption means for decrypting the at least one encrypted image signal to provide at least one decrypted image signal;

decoding means for decoding the encoded image signals including the at least one decrypted image signal; and producing means for producing an image signal by using the at least one decoded decrypted image signal.

12. An image processing apparatus according to claim 11, wherein the output of the encrypted image signal is inhibited when said decryption means cannot decrypt the encrypted image signal.

13. An image processing apparatus for decrypting image signals that were previously formed by dividing a first image signal into a plurality of image signals of different resolutions and by encrypting at least one of the image signals of different resolutions to provide at least one encrypted image signal, comprising:

decryption means for decrypting the at least one encrypted image signal to provide at least one decrypted image signal; and synthesization means for synthesizing the at least one decrypted image signal with other image signals, wherein a predetermined signal is produced in lieu of the at least one encrypted image signal when said decryption means cannot decrypt the at least one encrypted image signal.

14. An image processing apparatus comprising:

a) separation means for separating input image data into low resolution image data and one or more auxiliary image data for interpolating the low resolution image data; and b) encryption means for encrypting at least one of the auxiliary image data.

15. An image processing apparatus according to claim 14, wherein the low resolution image data and the auxiliary image data, both of which are output from said separation means, are both encoded data.

16. An image processing apparatus according to claim 14, further comprising:

synthesization means for synthesizing the low resolution image data with the auxiliary image data.

17. An image processing apparatus for decrypting image data that were previously formed by separating image data into low resolution image data and one or more auxiliary image data for interpolating the low resolution image data and then encrypting at least one of the auxiliary image data to provide at least one encrypted auxiliary image data, comprising:

decryption means for decrypting the at least one encrypted auxiliary image data to provide at least one decrypted auxiliary image data; and synthesization means for synthesizing the low resolution image data with the at least one decrypted auxiliary image data.

18. An image processing apparatus according to claim 17, wherein the low resolution image data and the auxiliary image data are encoded, and the image processing apparatus further comprises decoding means for decoding the encoded low resolution image data and auxiliary image data.

19. An image processing apparatus according to claim 17, wherein the output of the encrypted auxiliary image data is inhibited when said decryption means cannot decrypt the encrypted image data.

20. An image processing apparatus according to claim 17, wherein a predetermined signal is outputted in lieu of the encrypted auxiliary image data when said decryption means cannot decrypt the encrypted image data.

21. An image processing apparatus comprising:

separation means for separating input image data into low resolution image data and one or more auxiliary image data for interpolating the low resolution image data; and masking means for masking at least one of the auxiliary image data.

22. An image processing apparatus according to claim 21, wherein the low resolution image data and the auxiliary image data, both of which are output from said separation means, are both encoded data.

23. An image processing apparatus according to claim 21, further comprising:

synthesization means for synthesizing the low resolution image data with the auxiliary image data.

24. An image processing method comprising:

an input step of inputting an image signal;

a division step of dividing the image signal inputted by said input step into a plurality of frequency band signal groups;

an encoding step of encoding the signal groups by using an orthogonal transform to provide encoded signals; and an encrypting step of encrypting at least one of the encoded signals.

25. The image processing method according to claim 24, further comprising:

a multiplexing step of multiplexing the encoded signal groups.

26. The image processing method according to claim 24, wherein the frequency band signal groups are signal groups having predetermined spatial frequency components.

27. An image processing method comprising:

an input step of inputting an image signal;

a conversion step of converting the image signal inputted by said input step into a plurality of converted image signals of different resolutions;

an encoding step of encoding the converted image signals by using an orthogonal transform; and an encryption step of encrypting at least one of the converted image signals encoded at said encoding step.

28. The image processing method according to claim 27, further comprising:

a multiplexing step of multiplexing the encoded image signals.

29. An image processing method of decrypting signal groups that were previously formed by encoding a plurality of frequency band signal groups by using an orthogonal transform to provide encoded signal groups and by encrypting at least one of the frequency band signal groups to provide at least one encrypted signal group, the frequency band signal groups having been generated from an image signal, comprising:

a decryption step of decrypting the at least encrypted signal group to provide a decrypted signal;

a decoding step of decoding the encoded signal groups including the at least one decrypted signal group; and a producing step of producing an image signal by using the at least one decoded decrypted signal group.

30. The image processing method according to claim 29, wherein the output of the encrypted signal group is inhibited when said decryption step cannot decrypt the encrypted signal group.

31. The image processing method according to claim 29, wherein the frequency band signal groups are signal groups having predetermined spatial frequency components.

32. An image processing method of decrypting signal groups that were previously formed by dividing an image signal into a plurality of frequency band signal groups and by encrypting at least one of the frequency band signal groups to provide at least one encrypted signal group, comprising:

a decryption step of decrypting the at least one decrypted signal group to provide at least one decrypted signal group; and a synthesization step of synthesizing the at least one decrypted signal groups with other signal groups, wherein a predetermined signal is produced in lieu of the at least one encrypted signal group when said decryption step cannot decrypt the at least one encrypted signal group.

33. The image processing method according to claim 32, wherein the frequency band signal groups are signal groups having predetermined spatial frequency components.

34. An image processing method of decrypting image signals that were previously formed by encoding a plurality of image signals of different resolutions by using an orthogonal transform to provide encoded image signals and by encrypting at least one of the plurality of image signals to provide at least one encrypted image signal, comprising:

a decryption step of decrypting the at least one encrypted image to provide at at least one decrypted image signal;

a decoding step of decoding the encoded image signals including the at least one decrypted image signal; and a producing step of producing an image signal by using the at least one decoded decrypted image signal.

35. The image processing method according to claim 34, wherein the output of the encrypted image signal is inhibited when said decryption step cannot decrypt the encrypted image signal.

36. An image processing method of decrypting image signals that were previously formed by dividing an image signal into a plurality of image signals of different resolutions and by encrypting at least one of the image signals of different resolutions to provide at least one encrypted image signal, comprising:

a decryption step of decrypting the at least one encrypted image signal to provide at least one decrypted image signal; and a synthesization step of synthesizing the at least one decrypted image signal with other image signals, wherein a predetermined signal is produced in lieu of the at least one encrypted image signal when said decryption step cannot decrypt the at least one encrypted image signal.

37. An image processing method comprising:

a) a separation step of separating input image data into low resolution image data and one or more auxiliary image data for interpolating the low resolution image data; and b) an encryption step of encrypting at least one of the auxiliary image data.

38. The image processing method according to claim 37, wherein the low resolution image data and the auxiliary image data, both of which are output in said separation step, are both encoded data.

39. The image processing method according to claim 37, further comprising:

a synthesization step of synthesizing the low resolution image data with the auxiliary image data.

40. An image processing method of decrypting image data that were previously formed by separating image data into low resolution image data and one or more auxiliary image data for interpolating the low resolution image data and then encrypting at least one of the auxiliary image data to provide at least one encrypted auxiliary image data, comprising:

a decryption step of decrypting the at least one encrypted auxiliary image data to provide at least one decrypted auxiliary image data; and a synthesization step of synthesizing the low resolution image data with the at least one decrypted auxiliary image data.

41. The image processing method according to claim 40, wherein the low resolution image data and the auxiliary image data are encoded, and said image processing method further comprises a decoding step of decoding the encoded low resolution image data and auxiliary image data.

42. The image processing method according to claim 40, wherein the output of the encrypted auxiliary image data is inhibited when said decryption step cannot decrypt the encrypted image data.

43. The image processing method according to claim 40, wherein a predetermined signal is outputted in lieu of the encrypted auxiliary image data when said decryption step cannot decrypt the encrypted image data.

44. An image processing method comprising:

a) a separation step of separating input image data into low resolution image data and one or more auxiliary image data for interpolating the low resolution image data; and b) a masking step of masking at least one of the auxiliary image data.

45. The image processing method according to claim 44, wherein the low resolution image data and the auxiliary image data, both of which are output in said separation step, are both encoded data.

46. The image processing method according to claim 44, further comprising:

a synthesization step of synthesizing the low resolution image data with the auxiliary image data.

47. An image processing apparatus comprising:

input means for inputting an image signal;

division means for dividing the image signal inputted by said input means into a plurality of signal groups;

encoding means for encoding the signal groups by using an orthogonal transform to provide encoded signal groups; and encrypting means for encrypting at least one of the encoded signal groups.

48. An image processing method comprising:

an input step of inputting an image signal;

a division step of dividing the image signal inputted by said input step into a plurality of signal groups;

an encoding step of encoding the signal groups by using an orthogonal transform to provide encoded signal groups; and an encrypting step of encrypting at least one of the encoded signal groups.

49. An image processing apparatus for decrypting signal groups that were previously formed by encoding a plurality of signal groups by using an orthogonal transform to provide encoded signal groups and by encrypting at least one of the plurality of signal groups to provide at least one encrypted signal group, the plurality of signal groups being generated from an image signal, comprising:

decryption means for decrypting the at least one encrypted signal group to provide at least one decrypted signal group;

decoding means for decoding the encoded signal groups including the at least one decrypted signal group; and producing means for producing an image signal by using the at least one decoded decrypted signal group.

50. An image processing method of decrypting signal groups that were previously formed by encoding a plurality of signal groups by using an orthogonal transform to provide encoded signal groups and by encrypting at least one of the plurality of signal groups to provide at least one encrypted signal group, the plurality of signal groups being generated from an image signal, comprising:

a decryption step of decrypting the at least one encrypted signal group to provide at least one decrypted signal group;

a decoding step of decoding the encoded signal groups including the at least one decrypted signal group; and a producing step of producing an image signal by using the at least one decoded decrypted signal group.

51. An image processing apparatus comprising:

conversion means for converting an image signal into a plurality of information signals having respective predetermined frequency components;

encryption means for encryption processing the plurality of information signals; and control means for controlling said encryption means to switch the encrypting processing of each information signal according to the respective predetermined frequency component.

52. The image processing apparatus according to claim 51, wherein each of the plurality of information signals comprises a predetermined spatial frequency component.

53. The image processing apparatus according to claim 51, wherein said control means controls said encrypting means to perform the encrypting processing on the information signal comprising a highest frequency component.

54. The image processing apparatus according to claim 51, wherein said control means controls said encrypting means not to perform the encrypting processing on the information signal comprising a lowest frequency component.

55. An image processing method comprising:

a conversion step of converting an image signal into a plurality of information signals having respective predetermined frequency components; and a control step of controlling encrypting processing so as to switch the encrypting processing of each information signal according to the respective predetermined frequency component.

56. The image processing method according to claim 55, wherein each of the plurality of information signals comprises a predetermined spatial frequency component.

57. The image processing method according to claim 55, wherein said control step performs the encrypting processing on the information signal comprising a highest frequency component.

58. The image processing method according to claim 55, wherein said control step does not perform the encrypting processing on the information signal comprising a lowest frequency component.

59. An image processing apparatus comprising:

compression means for compressing a plurality of image signals of different respective frequency components; and encrypting means for encrypting one image signal, of the plurality of image signals compressed by said compression means, having a predetermined frequency component.

60. The image processing apparatus according to claim 59, wherein said encrypting means encrypts the image signal having a highest frequency component.

61. An image processing method comprising:

a compression step of compressing a plurality of image signals of different respective frequency components; and an encrypting step of encrypting one image signal, of the plurality of image signals compressed by said compression step, having a predetermined frequency component.

62. The image processing method according to claim 61, wherein said encrypting step encrypts the image signal having a highest frequency component.

63. An image processing apparatus comprising:

means for providing a plurality of compressed image signals having different respective frequency components, where at least one of the plurality of compressed image signals is an encrypted compressed image signal;

decrypting means for decrypting the encrypted compressed image signal;

expanding means for expanding both the compressed image signal decrypted by said decrypting means and the other compressed image signals which are not encrypted to provide expanded image signals; and producing means for producing a plurality of different image signals by using the expanded image signals.

64. An image processing method comprising:

a providing step of providing a plurality of compressed image signals having different respective frequency components, where at least one of the plurality of compressed image signals is an encrypted compressed image signal;

a decrypting step of decrypting the encrypted compressed image signal;

an expanding step of expanding both the compressed image signal decrypted by said decrypting means and the other compressed image signals which are not encrypted to provide expanded image signals; and a producing step of producing a plurality of different image signals by using the expanded image signals.

65. An image processing apparatus comprising:

compression means for compressing a plurality of image signals of different respective resolutions, including one image signal of a predetermined resolution, to provide respective compressed signals; and encrypting means for encrypting the compressed signal corresponding to the one image signal of predetermined resolution.

66. The image processing apparatus according to claim 65, wherein the one image signal has a highest resolution of the plurality of image signals.

67. An image processing method comprising:

a compression step of compressing a plurality of image signals of different respective resolutions, including one image signal of a predetermined resolution, to provide respective compressed signals; and an encrypting step of encrypting the compressed signal corresponding to the one image signal of predetermined resolution.

68. The image processing method according to claim 67, wherein the one image signal has a highest resolution of the plurality of image signals.

69. An image processing apparatus comprising:

means for providing a plurality of compressed image signals, at least one of which is encrypted and the remainder of which are not encrypted, the plurality of compressed image signals having different respective resolutions;

decrypting means for decrypting the at least one encrypted compressed image signal to provide at least one decrypted compressed image signal;

expanding means for expanding the decrypted compressed image signal and the remainder of the compressed image signals to provide expanded signals; and producing means for producing a plurality of different image signals by using the expanded signals.

70. An image processing method comprising:

providing a plurality of compressed image signals, at least one of which is encrypted and the remainder of which are not encrypted, the plurality of compressed image signals having different respective resolutions;

decrypting the at least one encrypted compressed image signal to provide at least one decrypted compressed image signal;

expanding the decrypted compressed image signal and the remainder of the compressed image signals to provide expanded signals; and producing a plurality of different image signals by using the expanded signals.

* * * * *